US006480174B1

United States Patent
Kaufmann et al.

(10) Patent No.: US 6,480,174 B1
(45) Date of Patent: Nov. 12, 2002

(54) EYEGLASS-MOUNT DISPLAY HAVING PERSONALIZED FIT MODULE

(75) Inventors: Rick James Kaufmann, deceased, late of Los Gatos, by Carrie A. Kaufmann, legal representative; Raymond T. Hebert; James W. Pfeiffer, both of Los Gatos; Gary E. Hart, Santa Cruz; Loren D. Stirling, Aptos; Barry Wingate, San Jose; Roland J. Montalbo, San Jose; Peter K. S. Lee, San Jose, all of CA (US)

(73) Assignee: Optimize Incorporated, Los Gatos, CA (US)

( * ) Notice: Subject to any disclaimer, the term of this patent is extended or adjusted under 35 U.S.C. 154(b) by 0 days.

(21) Appl. No.: 09/415,613

(22) Filed: Oct. 9, 1999

(51) Int. Cl.[7] .................................................. G09G 5/00
(52) U.S. Cl. ................................ 345/8; 345/7; 348/52; 348/53; 359/13
(58) Field of Search .......................... 345/7, 8; 348/52, 348/53, 115; 359/13

(56) References Cited

U.S. PATENT DOCUMENTS

| 4,418,992 A | * 12/1983 | Davenport et al. .......... 351/169 |
| 4,969,714 A | 11/1990 | Fournier, Jr. et al. ....... 353/174 |
| 5,276,471 A | 1/1994 | Yamauchi et al. ........... 351/153 |
| 5,303,085 A | * 4/1994 | Rallison ....................... 359/631 |
| 5,534,689 A | 7/1996 | Barbier et al. ............ 250/206.2 |
| 5,539,422 A | 7/1996 | Heacock et al. ................ 345/8 |
| 5,572,749 A | 11/1996 | Ogden ............................. 2/421 |
| 5,739,797 A | 4/1998 | Karasawa et al. .............. 345/8 |
| 5,757,339 A | 5/1998 | Williams et al. ................ 345/8 |
| 5,757,544 A | 5/1998 | Tabata et al. ................ 359/434 |
| 5,815,126 A | * 9/1998 | Fan et al. ....................... 345/7 |
| 5,825,340 A | 10/1998 | Torizuka et al. ................ 345/8 |
| 5,880,773 A | * 3/1999 | Suzuki ........................... 345/8 |
| 6,034,653 A | * 3/2000 | Robertson et al. ............. 345/8 |

FOREIGN PATENT DOCUMENTS

| EP | 0 592 318 A2 | 4/1994 |
| EP | 0 899 599 A2 | 3/1999 |
| WO | WO 98/57214 | 12/1998 |
| WO | WO 98/59273 | 12/1998 |
| WO | WO 99/31543 | 6/1999 |

* cited by examiner

Primary Examiner—Bipin Shalwala
Assistant Examiner—Jimmy H. Nguyen
(74) Attorney, Agent, or Firm—Skjerven Morrill LLP; Christopher B. Allenby

(57) ABSTRACT

An eyeglass-mount display (EMD) device includes a frame, a display pod, and a personalized module removably coupled to the frame. The frame has a cross-bracket and a pair of ear pieces each coupled to an end of the cross-bracket. The display pod is mounted to the cross-bracket and includes an electronic image generator for generating an image and optics for creating a virtual image. The personalized module includes preset fitting adjustments specific to a particular user. The module may also include corrective optical lenses. The removable personalized module enables multiple users to share the same EMD frame and display pod without making numerous fitting adjustments upon donning the EMD.

12 Claims, 16 Drawing Sheets

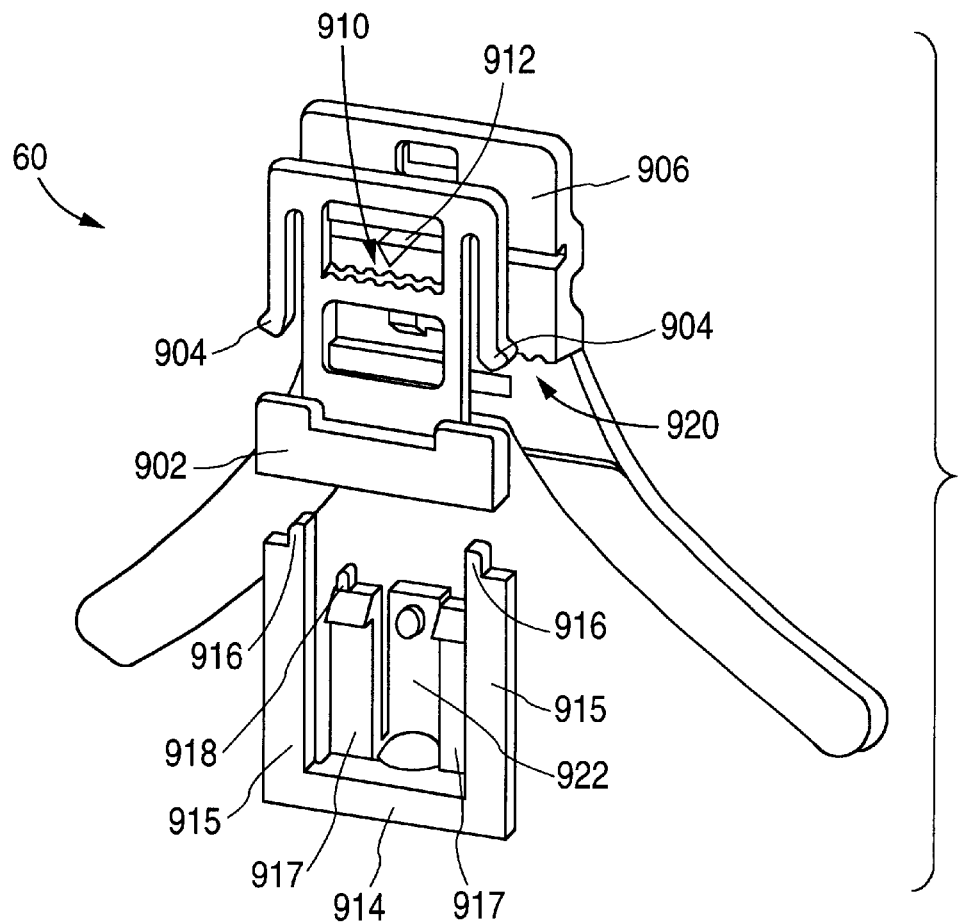
FIG. 10
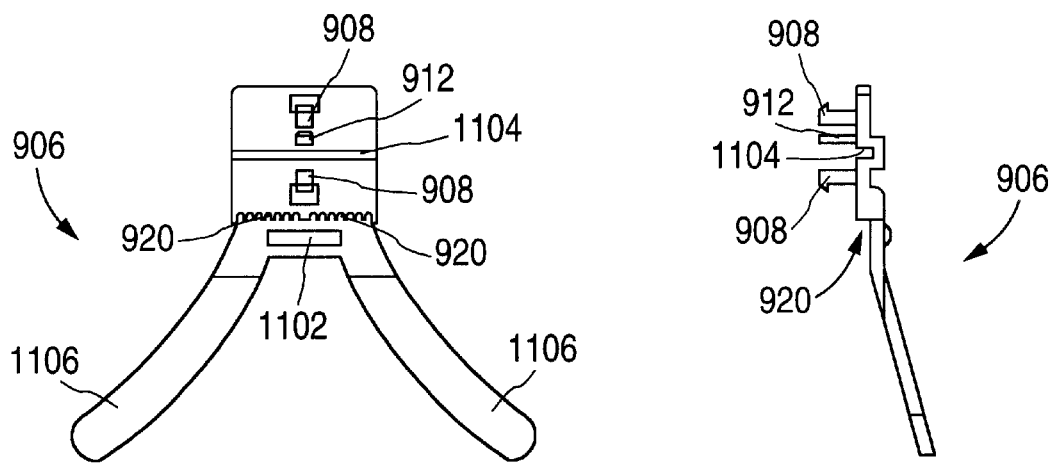
FIG. 11A  FIG. 11B

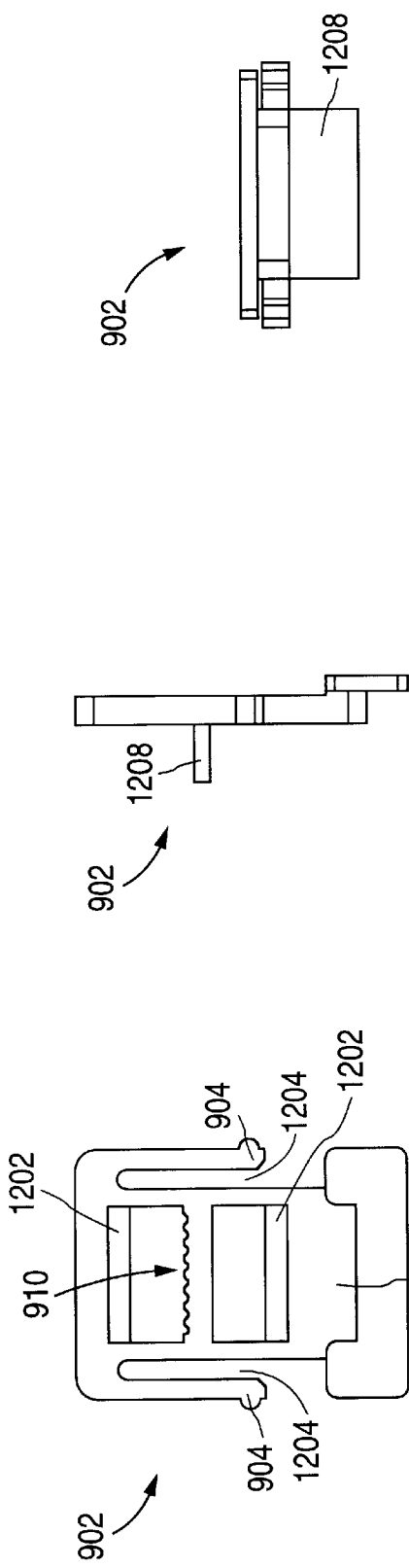

EYEGLASS-MOUNT DISPLAY HAVING PERSONALIZED FIT MODULE

BACKGROUND

1. Field of the Invention

The present invention relates to imaging display systems. More particularly, the present invention relates to an eyeglass-mount display system with a removable personalized module.

2. Related art

Convenient, high-quality and cost-effective remote imaging has become increasingly popular in the medical field during recent years. This is particularly true for surgical procedures, such as minimally invasive surgery, in which direct viewing of the surgical field by the surgeon is difficult. In minimally invasive surgery, a minimally invasive instrument, such as an endoscope or a laparoscope, is inserted into a patient through a body orifice or small incision. The minimally invasive instrument includes a video camera which enables the surgeon to view the surgical field. In a conventional surgical environment, the video camera transmits the video image via a cable to a conventional CRT video monitor. This arrangement is cumbersome in an operating room environment because equipment or surgical team members can obstruct the surgeon's view of the video monitor. In addition, room ambient illumination or surgical lighting can reduce the CRT display contrast, and the surgeon's viewing angle and distance from the CRT may not be favorable to quality vision and eye-hand coordination.

Head-mounted displays (HMDs) provide a solution to this problem. The image from the video camera of the minimally invasive instrument is transmitted to the HMD that the surgeon wears on his or her head. Thus, the HMD provides the surgeon with a direct, unobstructed view of the surgical field.

HMDs have become increasingly popular, but they are relatively expensive. HMDs used in the medical field require small but high resolution displays. In addition, many stereoscopic or binocular HMDs use dual display devices for two eye channels. One such medical stereoscopic HMD system having dual display devices is described in Heacock et al., "Viewing Ocular Tissues with a Stereoscopic Endoscope Coupled to a Head Mounted Display (HMD)" (visited Feb. 17, 1998) <http://www.hitl washington.edu/publications/heacock/>. Because these HMDs include two LCD displays, they are typically heavy, bulky, and expensive.

Due to the high cost of HMDs, several users may choose to share a single HMD. Because different users have different head dimensions and vision requirements, sharing a HMD requires each user make numerous adjustments to the HMD in order for the HMD to fit on an individual user's head properly and to avoid eye fatigue. These adjustments include adjusting for the spacing between each user's eyes, known as the inter-pupillary distance (IPD), as well as for the position of each user's eyes relative to his or her nose and ears. Requiring users to make these adjustments every time they don the HMD is both time consuming and complex. In addition, if the user fails to adjust the HMD properly, not only will the HMD be uncomfortable to wear, but it can also result in eye strain or eye fatigue. Furthermore, HMDs can be especially awkward and uncomfortable for users wearing corrective eyeglasses because the HMD must be worn over the corrective eyeglasses. Allowing for eyeglass wearers adds size and weight to the HMD design with resulting discomfort.

Thus, there is a need for an easily adjustable eyeglass-mount display (EMD) that can be shared among multiple users. The EMD should minimize the number of adjustments that each user is required to make each time he or she dons the device. In addition, there is a need for an EMD with a small but high resolution display so as to preserve peripheral vision.

The following references are commonly assigned with the present application and are incorporated herein by reference:

a. U.S. Pat. No. 5,926,318 titled "Biocular Viewing System with Intermediate Image Planes for an Electronic Display Device" issued to Raymond T. Hebert;

b. U.S. patent application Ser. No. 09/241,828, filed Feb. 1, 1999, entitled "Color Superposition, Mixing, and Correction for a Video Display System," by Raymond T. Hebert;

c. U.S. patent application Ser. No. 09/305,092, filed May 3, 1999, entitled "Infrared Audio/Video Interface for Head-Mounted Display," by Raymond T. Hebert et al.;

d. U.S. patent application Ser. No. 09362,927, filed Jul. 27, 1999, entitled "Color Superposition and Mixing of Light Beams for a Visual Display" by Raymond T. Hebert; and e. U.S. patent application Ser. No. 09373,807, filed Aug. 13, 1999, entitled "Compact Biocular Viewing System for an Electronic Display," by Raymond T. Hebert.

SUMMARY

In accordance with one embodiment of the invention, an eyeglass-mount display (EMD) apparatus includes a support frame, a display pod attached to the support frame, and a personalized module removably coupled to the frame. The frame has a cross bracket and a pair of spring-loaded ear pieces. Each ear piece is attached to an end of the cross bracket. The display pod is mounted on the cross bracket and includes an electronic image generator and optics for viewing a generated image. The display pod also includes an inter-pupillary distance adjustment and internal sighting mechanisms to aid proper image alignment for the user, thereby reducing long-term eyestrain.

The removable personalized module enables multiple users to share the same EMD frame and display pod without making numerous fitting adjustments upon swapping the display apparatus among each other. Some embodiments of the personalized module include a pair of corrective eye lenses that, if required, replace the user's normal corrective spectacles. The personalized module is fitted to a particular user by moving one or more integral adjustment mechanisms. The fitting adjustments accommodate the user's nose and ear heights in relation to his or her eyes. The adjustments also accommodate differences in eye level. An adjustable nose piece in the personalized module allows for horizontal and vertical adjustment of the display pod with respect to the user's eyes. Cams on the side of the personalized module adjust ear piece height, a movement that also moves the display pod with respect to the user's eyes. After donning the display apparatus, the user aligns the image generated in the display pod with his or her eyes by adjusting the nose piece and the ear pieces.

In accordance with the invention, each user first inserts his or her personalized module into the support frame and adjusts the nose piece and ear piece settings. The first user focuses the displayed image. Each user adjusts movable lenses in the display pod to accommodate his or her IPD and then makes fine fitting adjustments.

During use, when the EMD is swapped to a second user, the first user removes his or her personalized module, and the second user inserts their own preadjusted personalized module. The second user then adjusts the display pod for their IPD. But the second user need not adjust the fit or the focus.

BRIEF DESCRIPTION OF THE DRAWINGS

FIG. 10 is an exploded view of the nose piece assembly shown in FIG. 9.

FIGS. 11A and 11B are front and side views, respectively, of a nosepad support.

FIGS. 12A, 12B, and 12C are front, side, and top views, respectively, of a nosepad bracket.

FIGS. 13A, 13B, and 13C are front, side, and rear views, respectively, of a lock.

DETAILED DESCRIPTION

Some elements have been omitted from the drawings so as to more clearly show embodiments of the invention. In addition, some drawings are not to scale.

Figure 1:
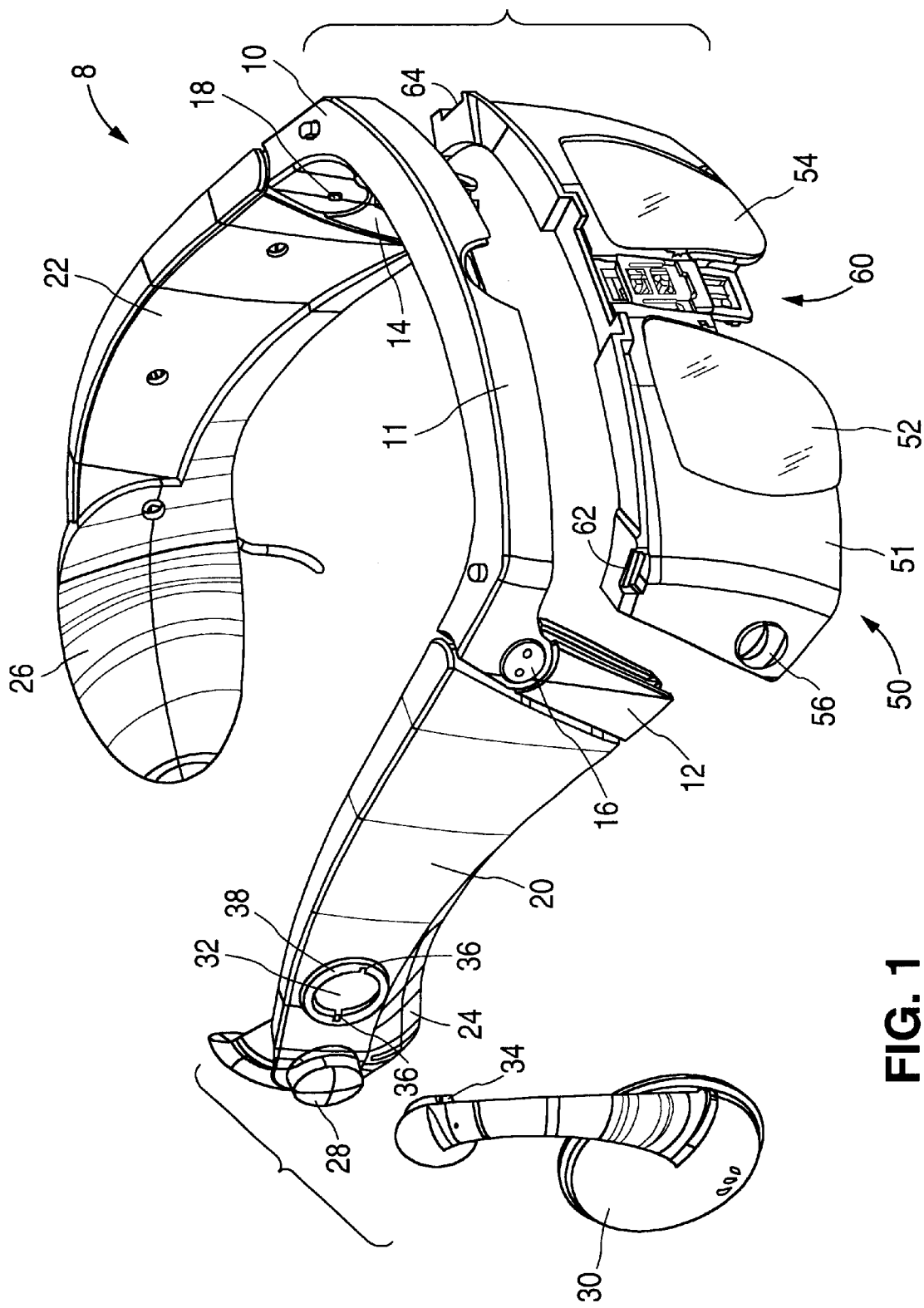
FIG. 1 is an exploded perspective view of a support portion of a display apparatus in accordance with the invention.

FIG. 1 is an exploded perspective view of the support portion of a display apparatus in accordance with the invention. A display pod for generating and displaying an image to the user, as described below, is omitted for clarity. As shown, support frame 8 has a cross-bracket 10 and two spring housings 12 and 14 attached to bracket 10. Housings 12 and 14 are spring-loaded forward and pivot around hinges 16 and 18, respectively. Support frame 8 also has ear pieces 20 and 22 that are attached to housings 12 and 14 respectively and pivot around hinges described in detail below. Ear pieces 20 and 22 are spring-loaded so as to provide inward pressure against the user's head. Soft silicone rubber pads 24 and 26 are attached to ear pieces 20 and 22 respectively for user comfort. Some embodiments use pads somewhat smaller than shown. A hook 28 is shown mounted on ear piece 20 and, along with a similar hook (not shown) on ear piece 22, holds a behind-the-head support strap (not shown) to snugly hold the support portion against the user's head. Portions of cross-bracket 10, housings 12 and 14, and ear pieces-20 and 22 are made as light as possible using, for example, injection-molded magnesium.

FIG. 1 also shows optional speaker 30 that is mounted to socket 32 on ear piece 20. Speaker 30 is held in socket 32 by tabs 34 (one of which is not shown) that fit into slits 36 in rim 38. Slits 36 are positioned such that tabs 34 are behind rim 38 to hold speaker 30 in place. When inactive, speaker 30 is rotated upwards to be adjacent ear piece 20. To use the speaker, the user rotates speaker 30 downwards to cover the ear. When rotated downwards, contacts electrically connect speaker 30 to wiring inside ear piece 20. In some embodiments a second speaker may be similarly positioned on ear piece 22.

FIG. 1 further shows personalized module 50 that is rigidly and removably attached to cross-bracket 10. In the embodiment shown, personalized module 50 includes blade 51, right lens 52, left lens 54, ratcheted cam 56, and adjustable nose piece 60. A second cam positioned on the left side of blade 51 opposite cam 56 is not shown. Two spring-loaded latches engage lips 62 and 64 on blade 51 to hold module 50 in cross-bracket 10. Each of these components is described in detail below. In some embodiments blade 51 is transparent plastic. In some embodiments in which the user does not require a vision prescription lenses 52 and 54 are omitted and blade 51 is a single solid piece across the openings for these lenses.

Of importance is that a single personalized module 50 is adjusted to fit an individual user. Each individual user will have his or her own personalized module. Therefore the EMD is quickly exchanged between users by the first user removing a first personalized module and the second user inserting a second personalized module. No delay occurs when the second user dons the display because many personalized fittings are contained in the second user's personalized module. The second user only adjusts for his or her inter-pupillary distance (IPD) as described below.

Figure 2:
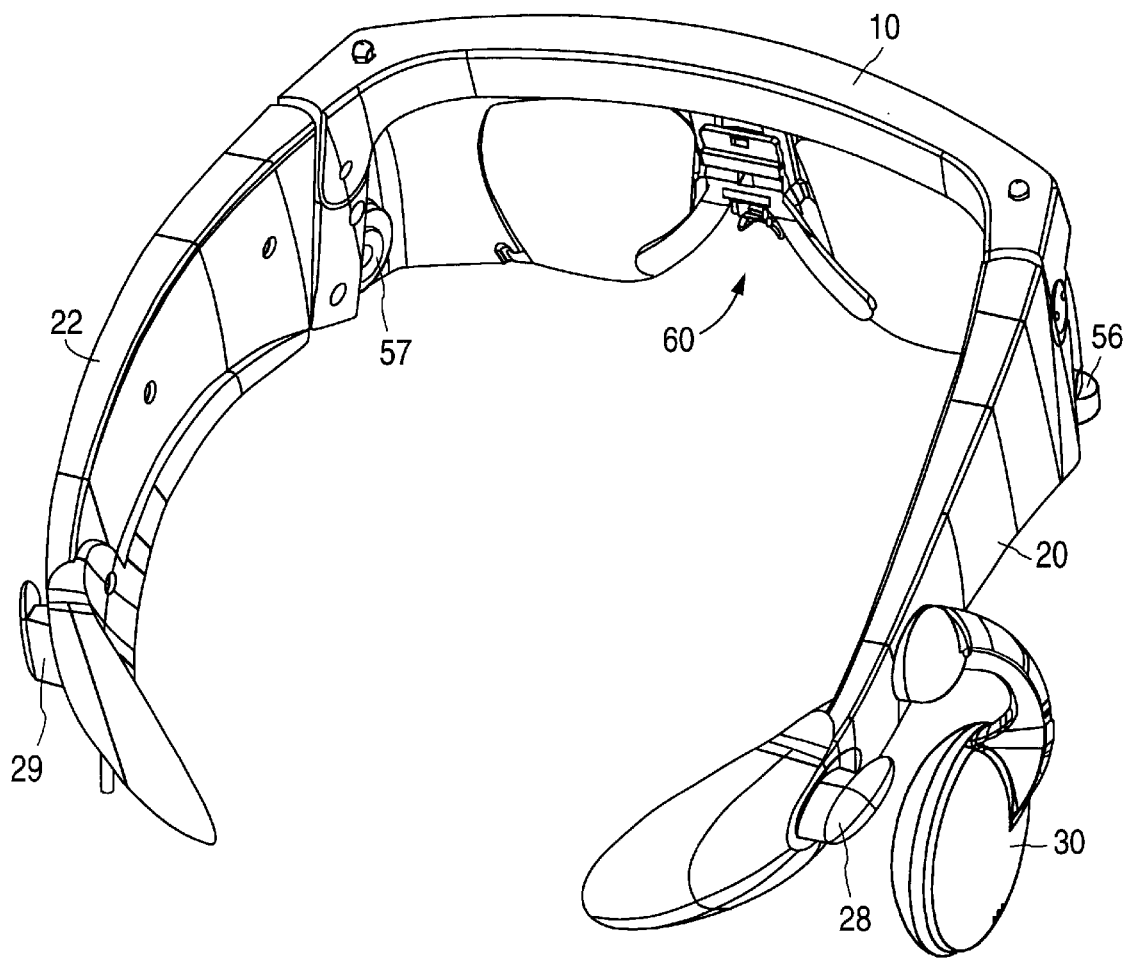
FIG. 2 is another perspective view of the embodiment of the invention shown in FIG. 1.

FIG. 2 is another perspective view of the embodiment of the invention shown in FIG. 1. Nose piece assembly 60 is more clearly shown in FIG. 2, although a silicone rubber pad normally covering a portion of nose piece assembly 60 has been omitted for clarity. Nose piece assembly 60 is adjustable left, right, up, and down with respect to frame 8. Left head strap hook 29 is shown opposite hook 28, as is ratcheted cam 57 opposite cam 56. Speaker 30 is shown connected to ear piece 20 in the activated position.

Figure 3:
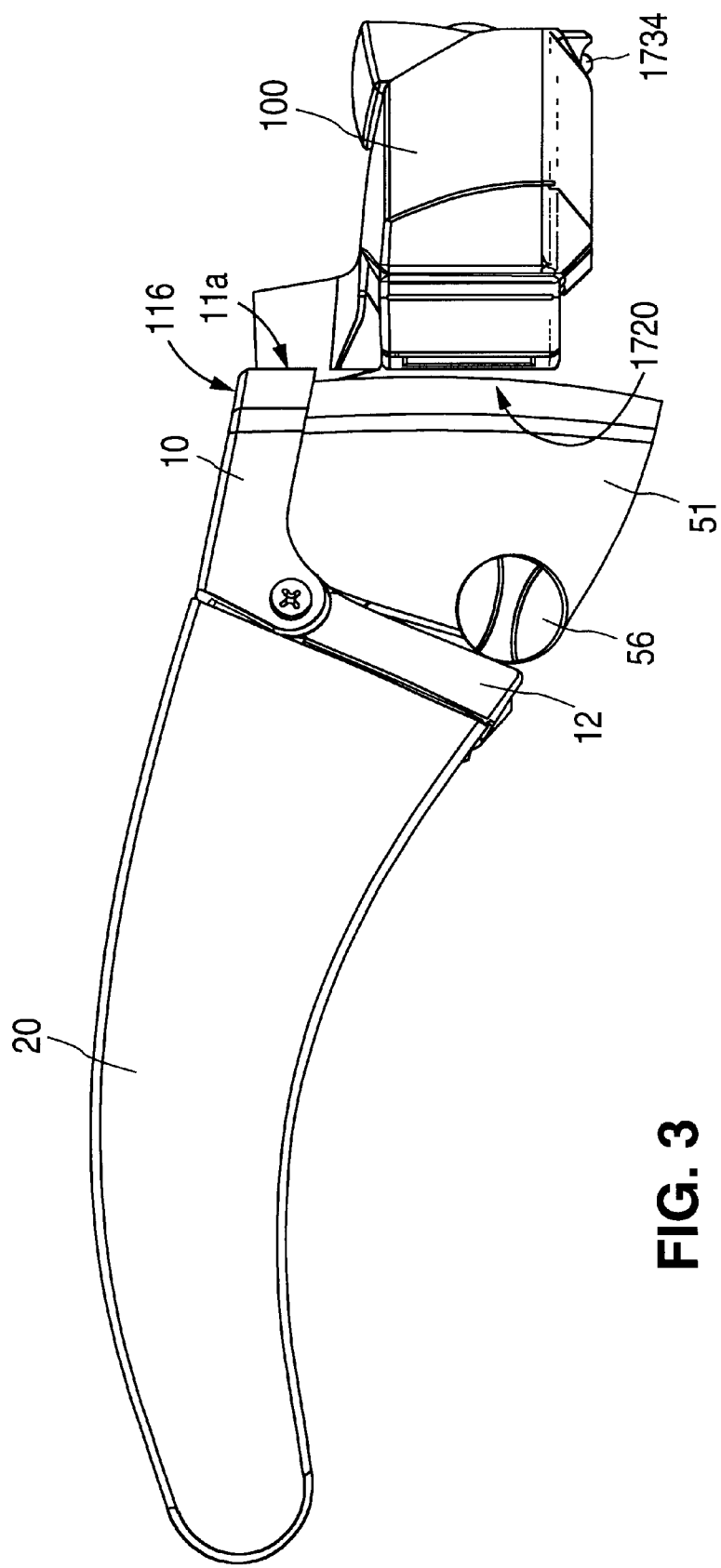
FIG. 3 is a side view of an embodiment of the invention showing a display pod attached to a support portion of a display apparatus.

FIG. 3 is a side view of an embodiment of the invention showing display pod 100 attached to front surface 11*a* of cross-bracket 10. In other embodiments display pod 100 is attached to top surface 11*b* of cross-bracket 10. In one embodiment display pod 100 is attached using three screws to cross-bracket 10. Display pod 100 contains an electronic video image generator and optics that are described in more detail below, and in the references cited above. Display pod 100 is also made as light as possible and in one embodiment is made of injection-molded magnesium or magnesium alloy. FIG. 3 shows housing 12 spring-loaded against ratcheted cam 56. The user adjusts the angle between housing 12 and blade 51 by turning cam 56, thereby adjusting the angle of ear piece 20 in relation to the viewing angle into display pod 100. The left ear piece 14 (FIG. 1) is similarly adjusted using cam 57 (FIG. 2) on the left side of blade 51, opposite cam 56.

The EMD uses a three-point mounting system to properly position display pod 100 with respect to the user's eyes. The EMD rests on the user's nose and on each of the user's ears. Small changes in the position of the EMD on the user's head significantly alter the user's line of sight into optics within pod 100. The nose and ears provide natural reference points for accurate visual alignment every time the user dons the display.

Figure 4:
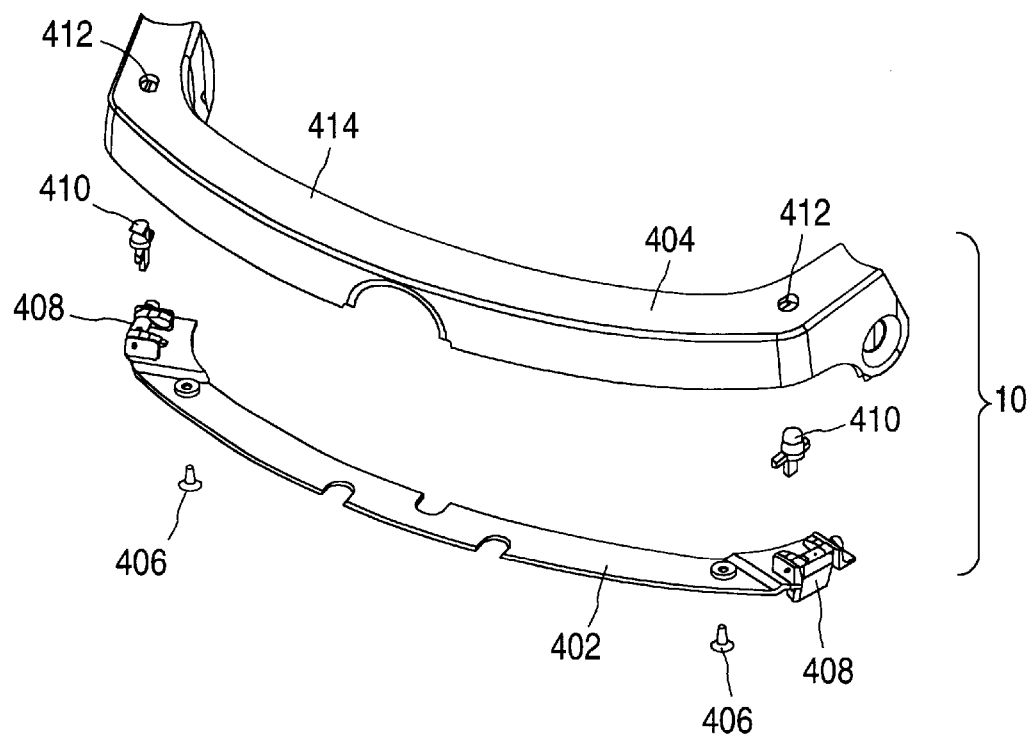
FIG. 4 is an exploded perspective view showing a cross-bracket and latches.
Figure 5A:
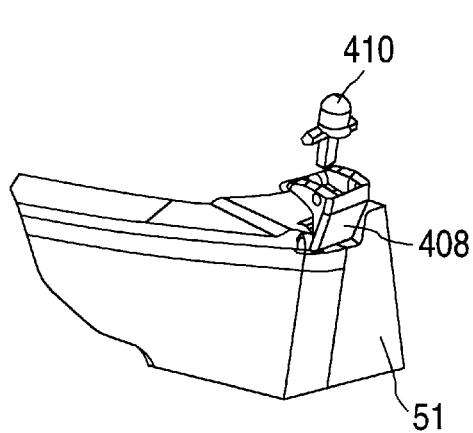
FIGS. 5A and 5B illustrate how latches open and release a personalized module.
Figure 5B:
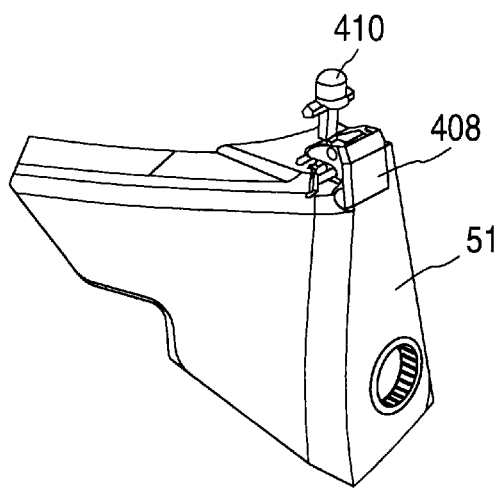

FIG. 4. is an exploded perspective view showing cross-bracket 10 in more detail. Latch bracket 402 fits into housing 404 and is held in place by screws 406. Two spring-loaded latches 408 are mounted on bracket 402. Latches 408 are opened by pressing on buttons 410 that extend through holes 412 in housing 404. As shown in FIGS. 5A and 5B, when buttons 410 are pushed down, latches 408 open and release lips 60 and 62 on blade 51 (FIG. 1). In some embodiments top surface 414 of housing 404 is flat so that buttons 410 may be simultaneously pressed by inverting the EMD and pressing it against a flat surface such as a table top.

Figure 6:
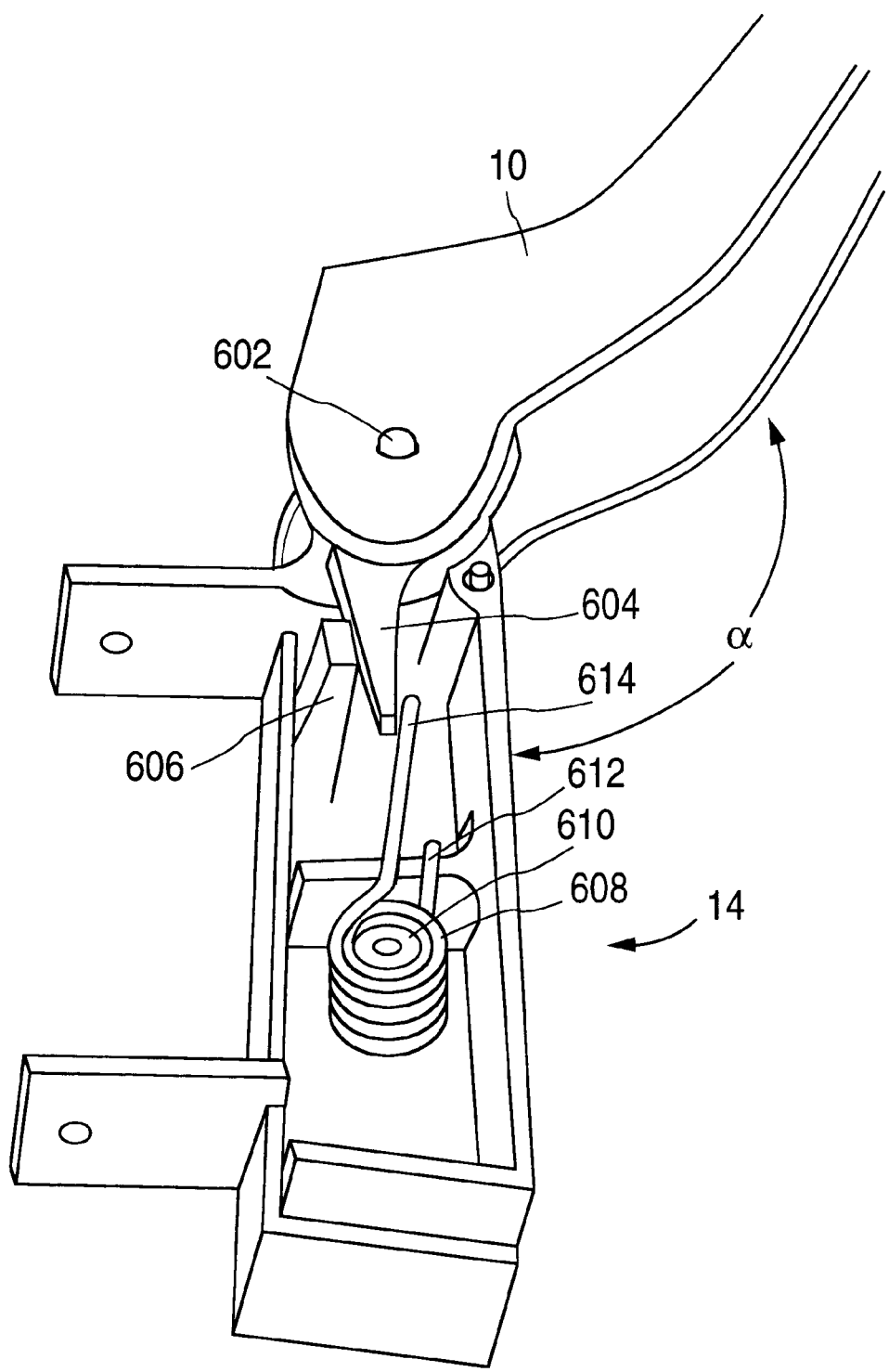
FIG. 6 is a perspective view of the interior of a spring housing.

FIG. 6 is a perspective view of the interior of spring housing 14. As shown, housing 14 is connected to frame 10 using hinge pin 602. Stop tab 604 is connected to frame 10 and stop post 606 is molded into housing 14. A minimum angle ax between frame 10 and housing 14 is established when tab 604 and post 606 contact each other. The angle ax may be increased, and spring 608 provides tension against this increase. Spring 608 is mounted around support post 610. One end 612 is anchored in housing 14 and the other end 614 rests against stop tab 604. Referring again to FIG. 3, the angle between blade 51, which is securely attached to cross-bracket 10, and housing 12 is adjusted by turning cam 56 and a similar cam on the other side of blade 51 (not shown). A user adjusts his or her looking angle into display pod 100 by turning these cams. Each ear piece 20 and 22 may be independently adjusted because a user's ears are typically at different levels. In addition, a user's eyes are often different levels as well. Turning the cams compensates for any vertical displacement between the user's eyes and display pod 100. Turning one cam individually, or both cams in opposite directions, rolls display pod 100 left or right with respect to the user's eyes. Simultaneously turning both cams in the same direction changes the pitch angle of pod 100 with respect to the vertical looking angle of the user's eyes.

Figure 7:
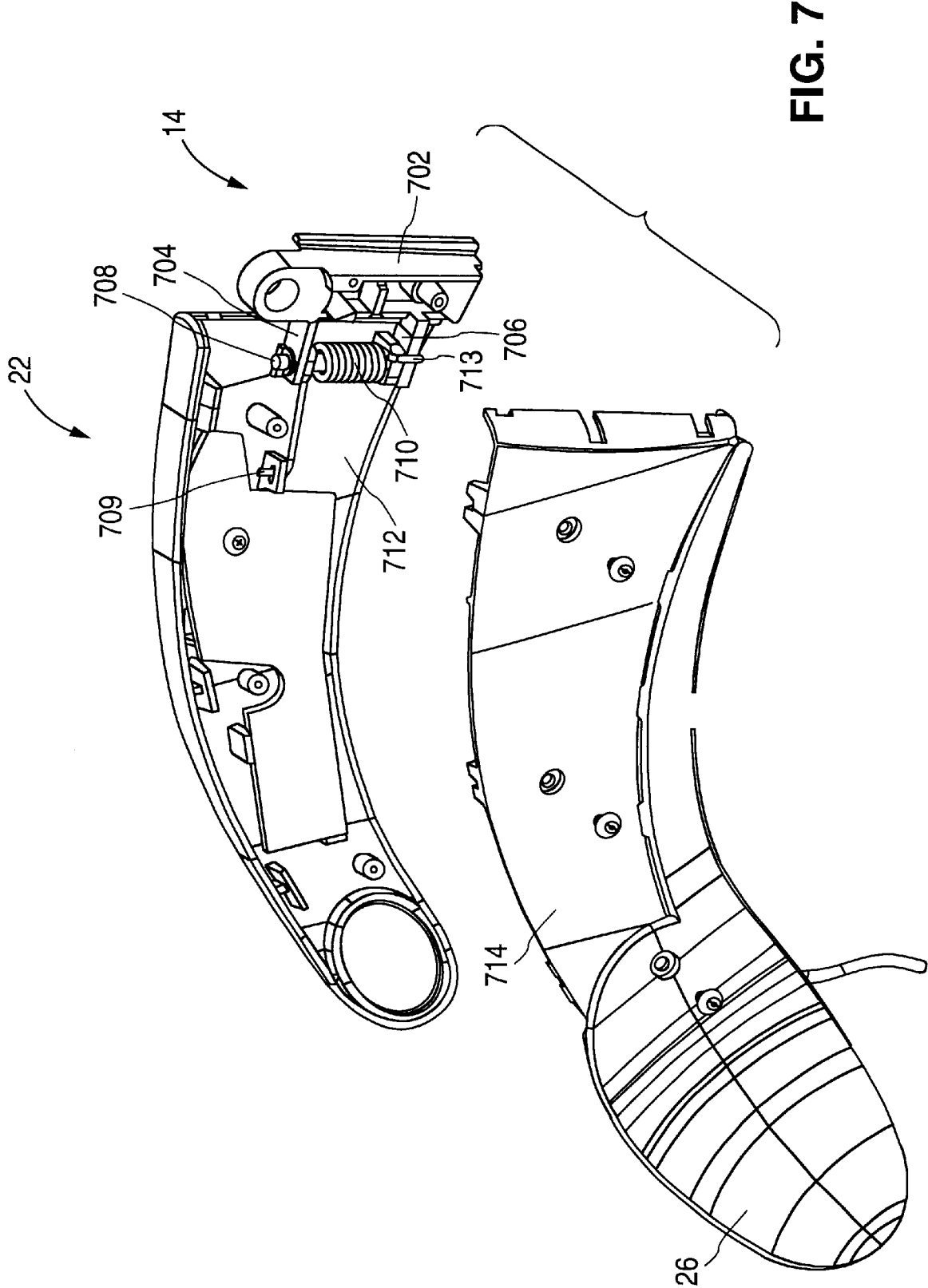
FIG. 7 is an exploded view of an ear piece.

FIG. 7 is an exploded view of left ear piece 22. As shown, spring bracket 702 has upper hinge bracket 704 and lower hinge bracket 706 extending into ear piece 22. Hinge pin 708 extends between brackets 704 and 706, and spring 710 is positioned around pin 708. One end 709 of spring 710 is connected to ear piece housing 712 and the other end 713 of spring 710 rests against lower hinge bracket 706. Spring 710 is wound so as to produce a torsional force around pin 708, thereby pulling ear piece 22 towards the user's head. Cover 714 protects the user from the interior of ear piece 22, and rubber pad 26 is mounted on cover 714.

Figure 8:
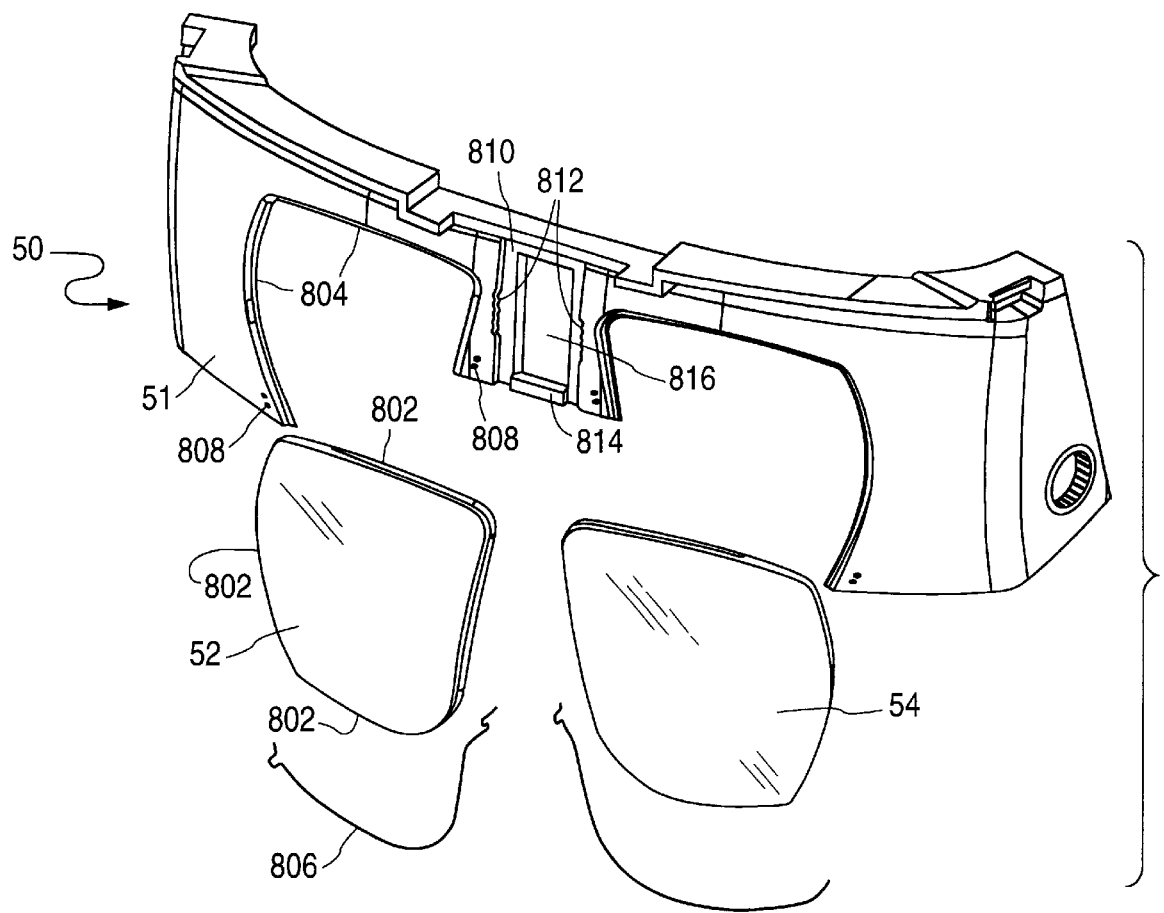
FIG. 8 is an exploded view showing several components of a personalized module.

FIG. 8 is an exploded view showing several components of personalized module 50. As shown, lenses 52 and 54 are conventionally mounted in blade 51. Lens 52 has a groove cut into the outer edge surface 802. A tongue 804 is formed in the receptacle for lens 52 and fits into groove 802 when lens 52 is in place. Lens 52 is then held in place using wire or string 806 threaded along the bottom portion of groove 802 and through holes 808 in blade 51. Lens 54 is similarly held in place. In some embodiments lenses 52 and 54 are ophthalmic plastic and are shaped as spectacle lenses to correct the user's vision and replace the user's spectacles during use. The prescription used is similar to one used for computer viewing, and is optimized for a 22-inch viewing distance. As described below, optics in pod 100 create an image at a 22-inch nominal distance from the user's eyes. This distance is close to the distance from the surgeon's eyes to the operating field. Thus a user does not change eye focus when looking between the image displayed in the optics, and the hands working in the surgical field.

Figure 21:
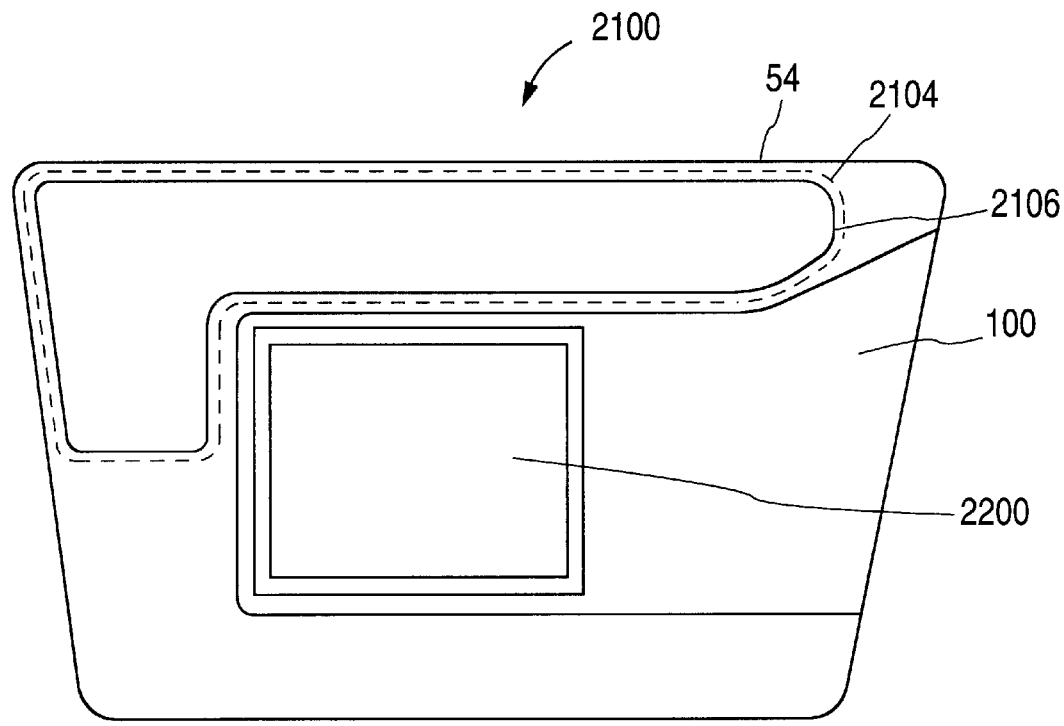
FIG. 21 illustrates optical corrections within a user's field of view.

Each lens 52 and 54 may contain two vision corrections. FIG. 21 represents a field of view 2100 that the user sees through left lens 54 when wearing the EMD. As shown, image 2102, generated in display pod 100, is positioned in the center of field 2100. A portion of display pod 100 blocks the user's peripheral vision to the right of image 2102. Lens 54 is given a prescription that allows the user to see at a 22-inch distance. Therefore, areas visible below, to the left, and above the image and display pod 100 are corrected to 22 inches. To enable the user to see at a far distance, however, lens 54 has a second vision correction. As shown, portion 2104 in field 2100 has a prescription for vision at infinity distance. In the embodiment shown, a clear, flexible plastic film 2106, having approximately −1.0 diopter correction, is attached to lens 54 as depicted. Film 2106 allows the user to see at a distance. Other embodiments may use other custom-made configurations for dual vision correction.

Referring again to FIG. 8, blade 51 is shaped to accommodate adjustable nose piece assembly 60 (FIG. 1). Groove 810 is molded into blade 51 and a plurality of detents 812 are molded into the sides of groove 810. Cross piece 814 closes across groove 810 and forms opening 816 into which nose piece assembly 60 is mounted.

Figure 9:
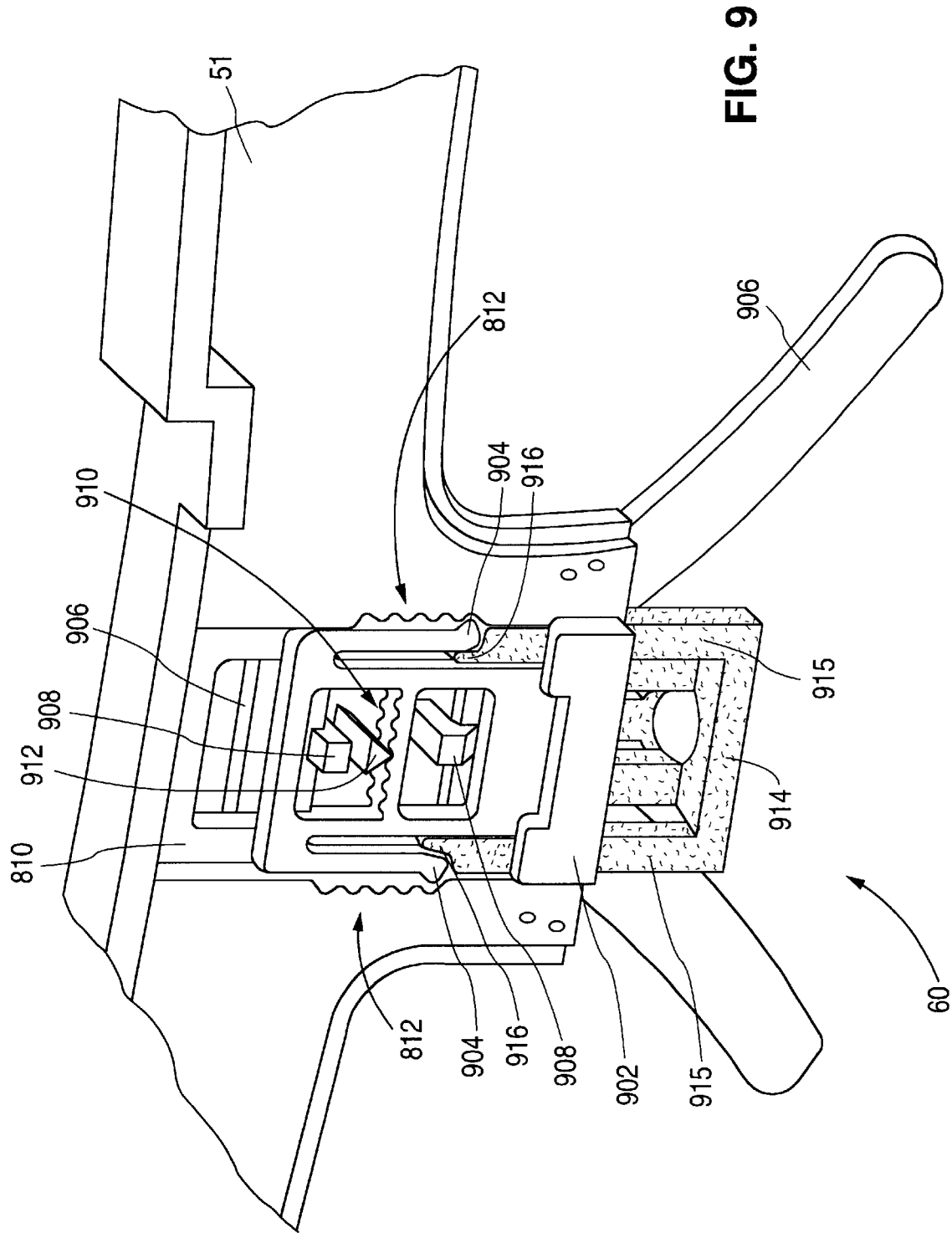
FIG. 9 is a perspective view of a nose piece assembly.

FIG. 9 shows in more detail nose piece assembly 60 mounted in blade 51, and FIG. 10 is an exploded view of nose piece assembly 60. Nosepad bracket 902 rests in and slides vertically in groove 810 on the front side of blade 51. Spring tabs 904 push into detents 812 to hold bracket 902 in a desired vertical position.

Nosepad support 906 is placed behind blade 51. Spring latch tabs 908 on nosepad support 906 extend through opening 816 (FIG. 8) and clip to bracket 902. Thus blade 51 is sandwiched between bracket 902 and nosepad support 906. Nosepad support 906 is also spaced apart from nosepad bracket 902 using an alignment tab on bracket 902, shown in detail below.

Nosepad support 906 slides horizontally on bracket 902. A series of horizontal index detents 910 are molded into bracket 902 as shown. Horizontal spring index tab 912 pushes into horizontal index detents 910 to hold nosepad support 906 in a desired horizontal position.

Support bracket 902 and nosepad support 906 are locked into position using lock 914. Front posts 915 of lock 914 fit in front of cross piece 814 (FIG. 8) to lock bracket 902 in place. When the user slides lock 914 upwards, vertical lock tabs 916 on posts 915 prevent spring tabs 904 on bracket 902 from moving inward and support bracket 902 is locked in its vertical position. Back posts 917 of lock 914 fit behind cross piece 814 to lock nosepad support 906 in place. Horizontal lock tabs 918 on posts 917 engage detents 920 on nosepad support 906, and support 906 is locked in its horizontal position. Lock 914 is held in the lock position by spring catch 922 that engages a groove (1102 in FIG. 11A) in support 906. When the user unlocks the nosepiece assembly, catches (1304, FIGS. 13A and 13B) on the tops of posts 915 engage cross piece 814 to prevent lock piece 914 from falling out.

FIGS. 11A and 11B are front and side views, respectively, of nosepad support 906. Shown are spring latch tabs 908, spring index tab 912, and horizontal lock detents 920, as described above. Also shown is lock groove 1102, into which spring catch 922 on lock 914 engages. Alignment groove 1104 is also shown. Nose pad holders 1106 hold the nosepad described below. In one embodiment nosepad support 906 is made of DUPONT® DELRIN® type 500 AF (20% Teflon PTFE fiber in acetal). In other embodiments support 906 may be made of other material such as plastic over molded spring steel.

FIGS. 12A, 12B, and 12C are front, side, and top views, respectively, of nosepad bracket 902. As shown in FIG. 12A, spring latch tabs 908 of nosepad support 906 (FIGS. 11A and 11B) engage and slide along lips 1202. Spring index tab 912 of nosepad support 906 (FIGS. 11A and 11B) engages horizontal index detents 910. Spring tabs 904 push into vertical detents 812 of blade 51 (FIG. 9). Spaces 1204 exist between spring tabs 904 and bracket body 1206. FIG. 12B shows alignment tab 1208 that fits into alignment groove 1104 in nosepad support 906 (FIGS. 11A and 11B). FIG. 12C shows the width of alignment tab 1208. In one embodiment bracket 902 is made of DUPONT ® DELRIN ® type 500 AF.

FIGS. 13A, 13B, and 13C are front, side, and rear views, respectively, of lock 914. When the user slides lock 914 upwards, vertical lock tabs slide into spaces 1204 on bracket 902 (FIG. 12A), thereby holding bracket 902 in position with respect to blade 51. Simultaneously, horizontal lock tabs 918 engage horizontal lock detents 920 (FIG. 11A), thereby holding nose piece support 906 in position with respect to bracket 902. FIG. 13B shows ridge 1302 on spring catch 922 that engages lock groove 1102 on nosepad support 906 when lock 914 is in the locked position. When the user wants to make an adjustment, he or she slides lock 914 downwards. Spring catches 1304 engage cross piece 814 (FIG. 8) to keep lock 914 from falling out of nose piece assembly 60. Lock 914 has a cutaway portion 1306 to accommodate the user's nose. In one embodiment lock 914 is made of grade HF1110 LEXAN®.

Figure 14:
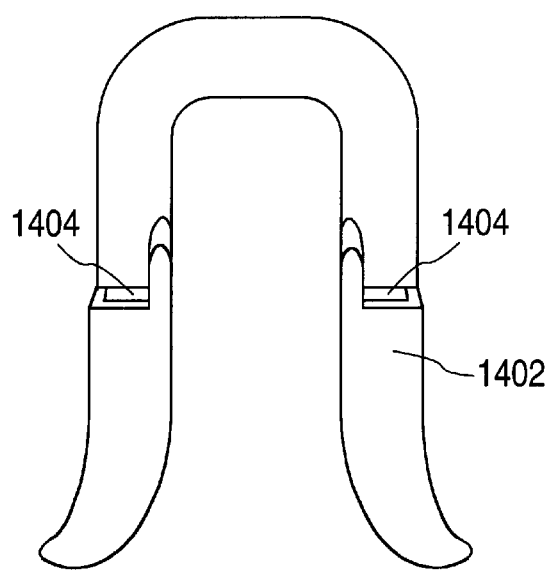
FIG. 14 is a front view of a nose pad.

FIG. 14 is a front view of nose pad 1402. Nose pad holders 1106 on nose pad support 906 (FIG. 11A) slide into holes 1404. In the embodiment shown, nose pad 1402 is molded of conventional silicone rubber in a U-shape. When pad 1402 is spread apart and mounted on nose pad holders 1106, the molded U-shape provides tension that holds the nose pad in place. Embodiments of the invention use nose pads of different shapes and thicknesses to accommodate the nose shapes and sizes of various users. When fitting the personalized module, each user chooses the nose pad that is most comfortable.

Figure 15:
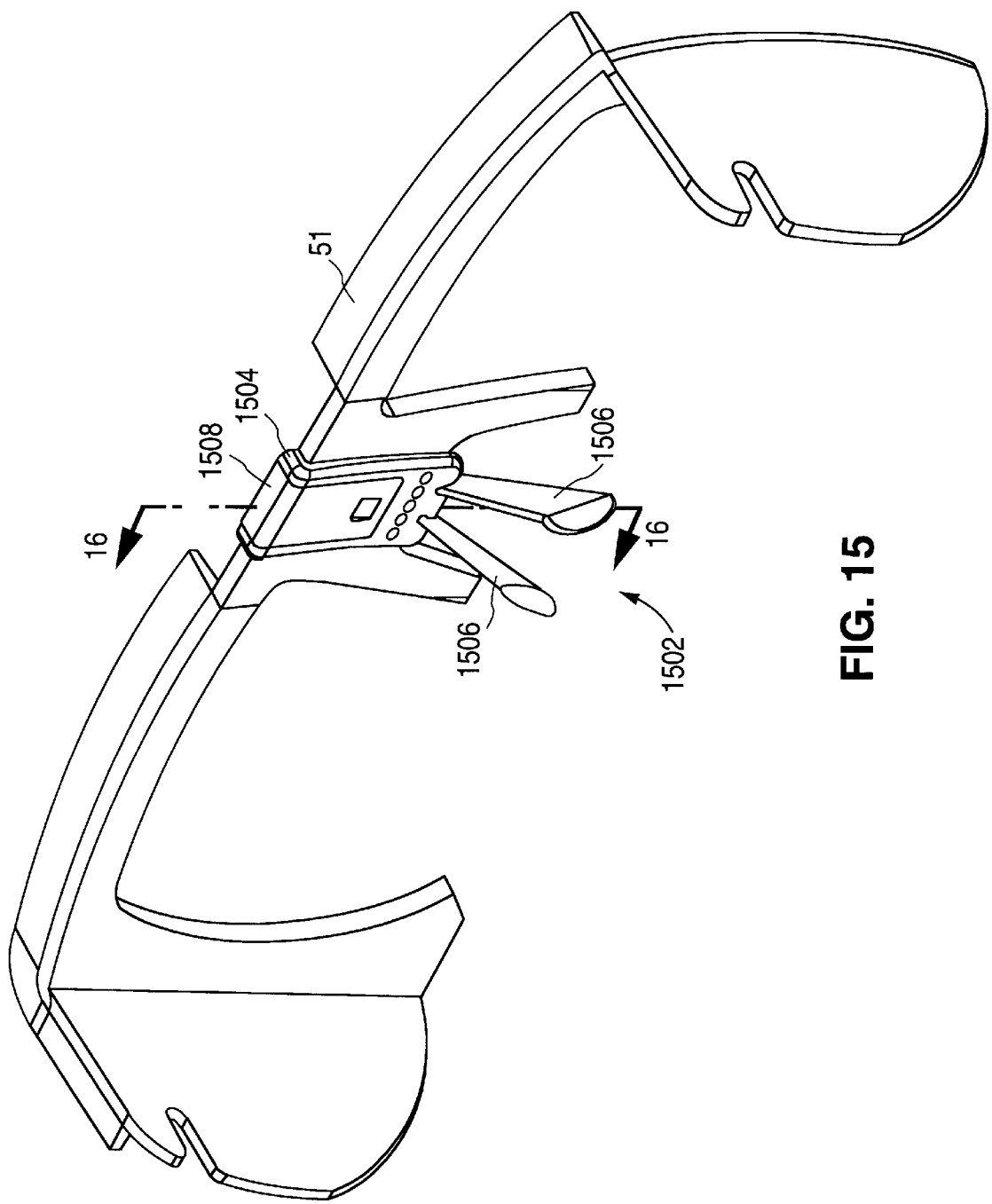
FIG. 15 is a perspective view of a second embodiment of a nose piece assembly.

FIG. 15 is a perspective view of another embodiment of a nose piece assembly 1502. As shown, nosepad support 1504 has two support pieces-1506 extending downward to rest against the nose (soft pads have been omitted for clarity). Nosepad support 1504 rests against blade 51 and is held in position by lock piece 1508 that fits over both blade 51 and nosepad support 1504.

Figure 16:
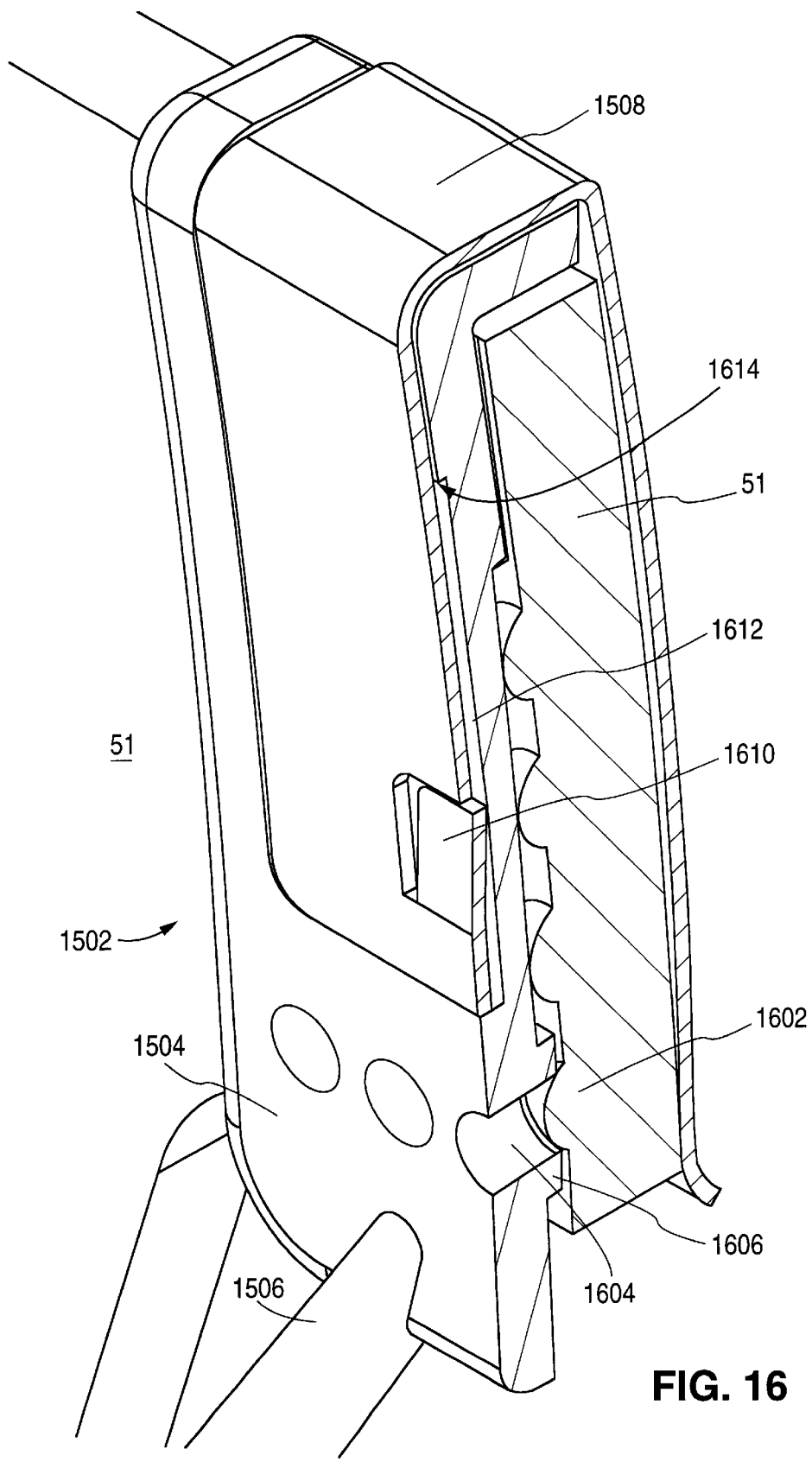
FIG. 16 is a cross-sectional perspective view showing the second embodiment of a nose piece assembly.

FIG. 16 is a cross-sectional view showing nose piece assembly 1502 in more detail. A vertical row of bumps, such as bump 1602, is formed on the back side of blade 51. A horizontal row of detents (e.g., holes), such as detent 1604, are formed in support 1504. A raised portion, such as annular boss 1606, surrounds the detents in support 1504. Support 1504 is horizontally adjusted by moving it so that one bump in the vertical row of bumps on blade 51 is in one of the horizontal detents. Similarly, support 1504 is vertically adjusted by sliding it so that a particular bump in the vertical line of bumps is engaged in one of the horizontal detents. When support 1504 is in the desired position, the user slides lock piece 1508 down to hold support 1504 firmly against blade 51. During adjustment, lock tab 1610 on lock piece 1508 slides in groove 1612 until reaching stop surface 1614 in support 1504. Lock tab 1610 keeps nose piece assembly 1502 together during adjustment.

Display pod 100 houses the optics and a miniature electronic display device for producing virtual rectangular video images with a nominal diagonal of 12 inches at a nominal distance of 22 inches from the user's eyes. Persons skilled in the art will understand that images include text and graphics, as well as video pictures. Display pod 100 has a receiver (not shown) for receiving infrared signals from a remote transmitting system. These infrared signals contain the information to be displayed to the user. Details of the infrared system can be found in U.S. patent application Ser. No. 09305,092, referred to above. The present invention deals primarily with an adjustable and interchangeable EMD. Therefore only those elements of display pod 100 necessary for properly aligning the video image for the users is described. Further details of the internal optics of display pod 100 are described in the references cited above (e.g., U.S. Pat. No. 5,926,318) and incorporated herein by reference. Pod 100 is approximately 3.5 inches wide, 1.3 inches high and 1.5 inches deep. Its small size minimally impacts the user's peripheral vision. Thus, when a user wearing the EMD looks straight ahead, the user looks directly into display pod 100 (see FIG. 21). However, by looking up, down, or to either side, the user will be able to see around display pod 100.

Figure 17:
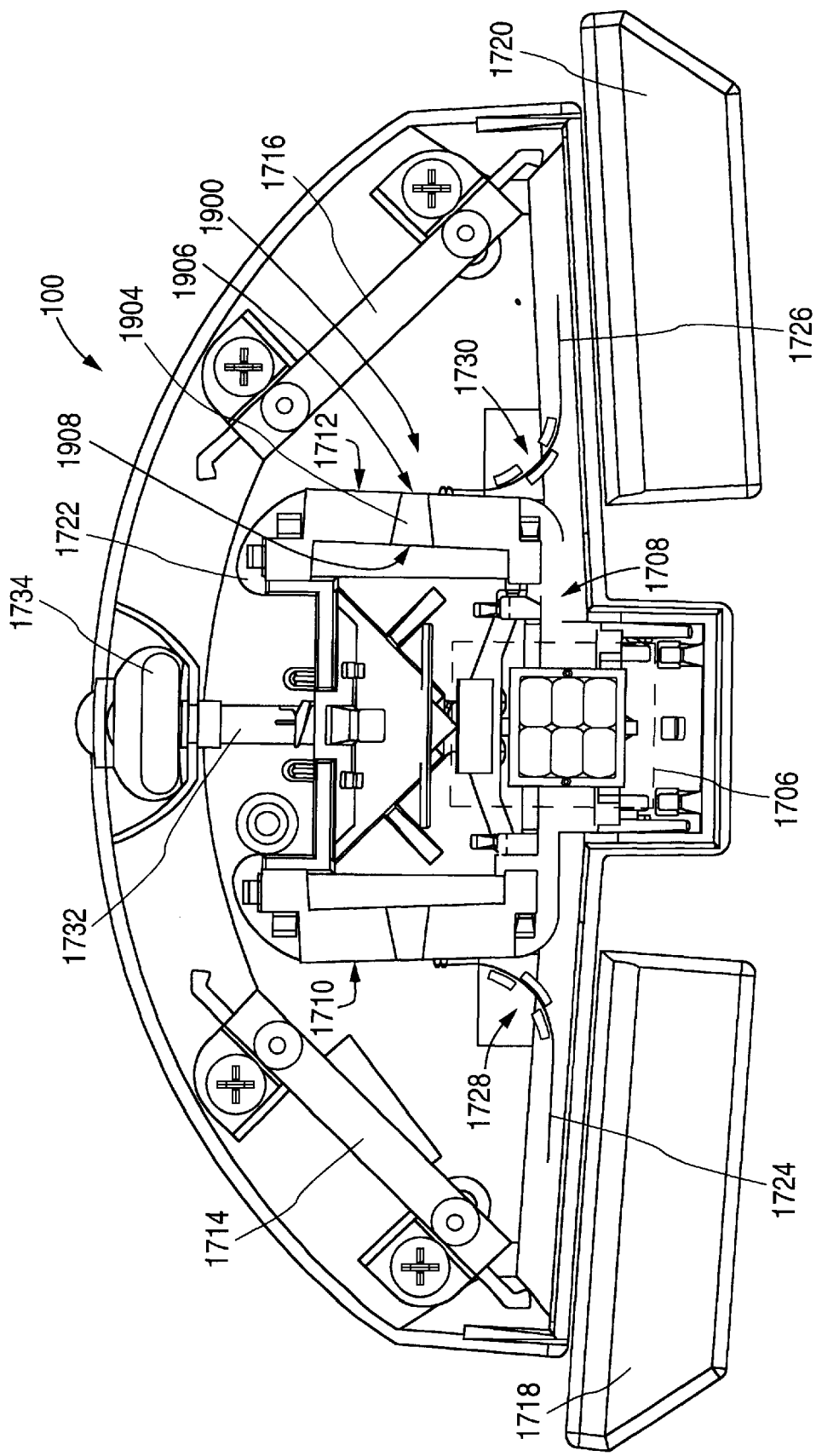
FIG. 17 is a top view diagram illustrating internal components of a display pod.

FIG. 17 illustrates the internal components of display pod 100. An image is created by electronic image generator 1706, shown in outline in order to more clearly illustrate the mechanisms, and optics 1708 direct the image along left and right folded optical centerlines, creating virtual images in intermediate image planes 1710 and 1712, respectively. Left mirror 1714 and right mirror 1716 are nominally angled at 43.3 degrees to fold the optical centerlines of intermediate image planes 1710 and 1712 to coincide with the slightly convergent optical centerlines of eyepiece lenses 1718 and 1720. To avoid eyestrain, this convergence is nominally set at 3.4 degrees for each eyepiece so that the visual centerlines nominally converge at the virtual image distance of 22 inches.

Display pod 100 includes a biocular viewing system having a movable left eyepiece lens 1718 and a movable right eyepiece lens 1720. Lenses 1718 and 1720 are located within the housing of display pod 100 and slide along tracks and grooves (omitted for clarity) in the housing. In some embodiments each lens is surrounded by a plastic cup and is sealed to the housing to prevent foreign matter, e.g. dust, from entering display pod 100. FIG. 3 shows the position of lens 1720 in relation to blade 51. Lenses 1718 and 1720 may be moved closer together or farther apart to accommodate the IPD of the user's eyes. To maintain focus, however, it is important that the total optical path length between the respective intermediate image planes and the eyepiece lenses be kept constant as the eyepiece lenses move. Thus, optics assembly 1708 must move in fixed relationship to eyepiece lenses 1718 and 1720.

To meet this requirement, optics 1708 are mounted on carriage 1722 that is movable toward and away from the user's eyes in display pod 100. Flexible metal bands 1724 and 1726 couple carriage 1722 to eyepieces 1718 and 1720, respectively. In the embodiment shown, coupling is done by punching holes in the metal bands and inserting molded plastic index tabs on the carriage and lenses into the holes. Metal band 1724 is routed through channel 1728 and metal band 1726 is routed through channel 1730. Channels 1726 and 1728 are formed using TEFLON®/acetal bearing surfaces in molded plastic parts. Therefore, as carriage 1722 moves forwards and backwards along its track, lenses 1718 and 1720 move inward and outward in a direction approximately orthogonal to the movement of carriage 1722. This coupled movement effectively eliminates the need for refocus when the IPD changes, such as when a new user dons, adjusts, and uses the EMD.

Lead screw 1732 is coupled using mating threads molded into carriage 1722. Knob 1734 is attached to the outer end of screw 1732 so that the user can easily turn screw 1732 while wearing the EMD to accommodate his or her IPD. FIG. 3 provides another view of knob 1734. In other embodiments a drive pin or other arrangement may be provided to move carriage 1722.

Figure 18:
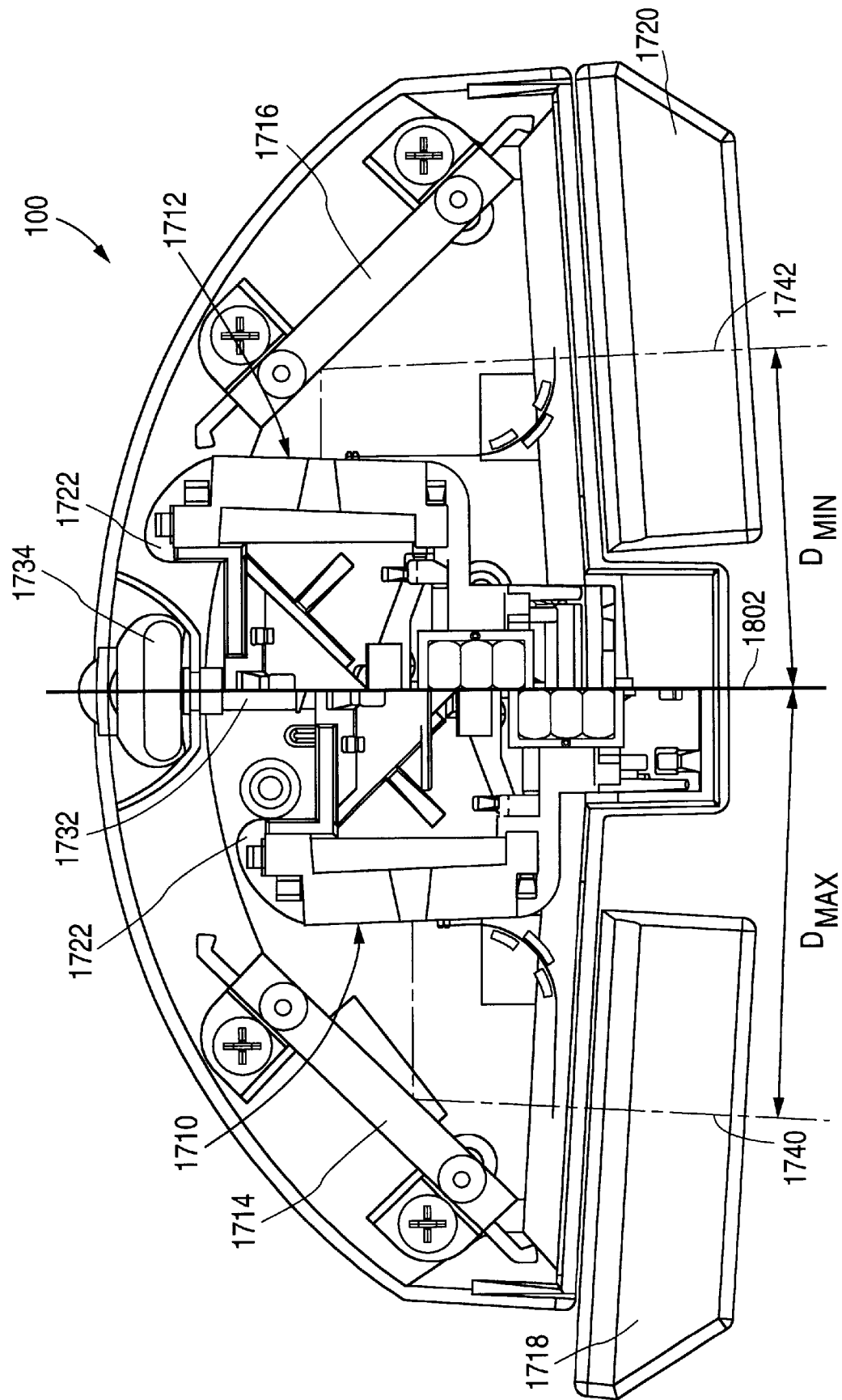
FIG. 18 is a split view diagram showing alternate positions of a carriage and lenses in a display pod.

FIG. 18 is a split view diagram showing alternate positions of carriage 1722 and lenses 1718 and 1720. FIG. 18 illustrates the full range of IPD settings for display pod 100. The left side of the drawing depicts an optical center of eyepiece lens 1718 at a farthest distance $D_{MAX}$ to centerline 1802 of display pod 100. The right side of the drawing depicts an optical center of eyepiece lens 1720 at a closest distance $D_{MIN}$ to centerline 1802. Both $D_{MAX}$ and $D_{MIN}$ values are one half of the maximum or minimum IPD setting, respectively. When lenses 1718 and 1720 are at the maximum IPD setting, as indicated by the left half of FIG. 18, carriage 1722 is closest to the user's eyes. When lenses 1718 and 1720 are at the minimum IPD setting, as indicated by the right half of FIG. 18, carriage 1722 is farthest from the user's eyes. Eyepiece lenses 1718 and 1720, along with carriage 1722, may be positioned anywhere between the maximum and minimum IPD settings by turning screw 1732 using knob 1734.

It can be seen that the optical path length remains essentially constant between intermediate image planes 1710 and 1712 and the lenses 1718 and 1720, respectively, as the IPD is adjusted. When the IPD is at maximum setting, as illustrated in the left half of FIG. 18, the optical path along optical centerline 1740 is the sum of the distance from image plane 1710 to mirror 1714 and from mirror 1714 to lens 1718. When the IPD is at minimum setting, as illustrated in the right half of FIG. 18, the optical path along optical centerline 1742 is the sum of the distance from image plane 1712 to mirror 1716, and from mirror 1716 to lens 1720. The length of optical paths 1740 and 1742 is essentially equal.

In other display devices, any available adjustments are often made intuitively, without the benefit of any visual target reference. Since the human vision system can briefly accommodate some vertical misalignment and a fair amount of horizontal misalignment, a user can easily misalign such display devices and endure these errors for a short period of time before noticing eye fatigue and other related discomforts. Accordingly, the present invention uses sighting mechanisms to provide visual references to avoid optical misadjustment.

Figure 19:
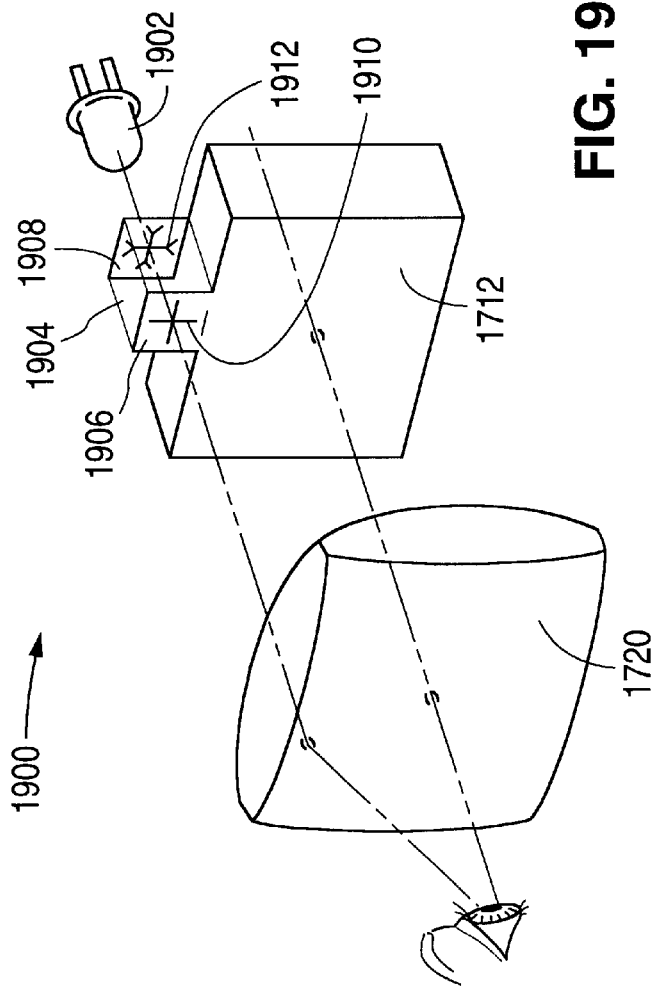
FIG. 19 illustrates a sighting mechanism used in the right side of a display pod.

FIG. 19 illustrates the sighting mechanism 1900 as used in the right side of display pod 100. A similar mechanism is used in the left side. Sighting mechanism 1900 allows the user to properly adjust his or her lines of sight to an intermediate image plane, e.g. image plane 1712. As shown, light source 1902, e.g., a LED, is located behind sighting block 1904, which is preferably molded plastic. Light source 1902 is activated by a conventional push-button switch (not shown) so that sighting alignment will not be distracting during normal use. Sighting block 1904 is mounted above intermediate image plane 1712 so as to have an optical axis different from path 1742 (FIG. 18). Sighting block 1904 has a front surface 1906 and a back surface 1908. Reticle image 1910 is placed on front surface 1906 and reticle image 1912 is placed on back surface 1908. Reticle images 1910 and 1912 are contrasting patterns. Sighting block 1904 is placed such that when the user's line of sight is aligned with the center of image plane 1712, reticle images 1910 and 1912 will be aligned and coincident. Therefore, sighting block 1904 acts as a proxy for aligning the user's actual line of sight with the center of intermediate image plane 1712.

Figure 20C:
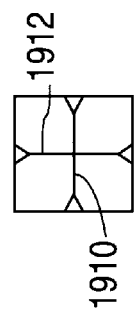
FIGS. 20A, 20B, and 20C illustrate reticle alignment patterns in a sighting mechanism.
Figure 20B:
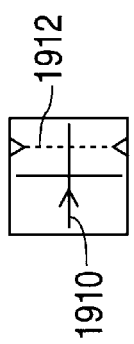
Figure 20A:
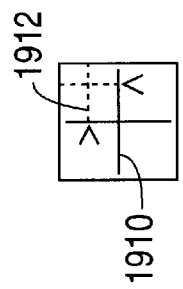

The parallax effect of the distance between reticles 1910 and 1912 alerts the user that his or her line of sight is improper and that an adjustment is required. Thus FIG. 20A illustrates a condition when the user's line of sight is both horizontally and vertically misaligned. FIG. 20B illustrates a horizontal misalignment only. FIG. 20C illustrates a condition when the user's line of sight is properly aligned. Although the sighting mechanism is shown using an optical axis different from the normal viewing axis, some embodiments may use a sighting mechanism coincident with the viewer's normal viewing axis.

Referring again to FIG. 17, sighting mechanism 1900 is shown for the right side of display pod 100. The left side has a similar, mirror-image configuration. As shown, sighting block 1904 is placed such that front surface 1906 is coplanar with image plane 1712. Back surface 1908 is shown opposite front surface 1906. Reticles (not shown) are placed on surfaces 1906 and 1908. The user aligns the reticles by making nose and ear adjustments on personal module 50 (FIG. 1).

The following acts illustrate a user's first-time adjustments made in conjunction with sighting mechanisms 1900 while wearing the EMD:

1. Insert personalized module 50 into frame 10. Adjust the cams to their mid-range point.
2. Turn on the light sources for the left and right sighting mechanisms.
3. Adjust the IPD setting by turning knob 1734 until both left and right sighting mechanisms are at least marginally visible.
4. Release the lock on the adjustable nose piece and adjust the nose piece vertically until the left and right sighting mechanism reticles are, on average, vertically balanced. For example, adjust until the left reticles are misaligned low by an equal distance as the right reticles are misaligned high.
5. Adjust the nose piece horizontally until the left and right sighting mechanism reticles are, on average, horizontally balanced. For example, adjust until the left reticles are too far left and the right reticles are too far right by an equal distance.
6. Lock the nose piece into position.
7. Adjust one cam, for example the right cam, until the reticles in the sighting mechanisms show that no roll exists. That is, both left and right reticles have the same vertical position. If additional roll adjustment is required, adjust the other cam, for example the left cam, as well. If the setting in step 4 above was correct, the vertical alignment will be proper.

8. Adjust the IPD setting by turning knob 1734 until both the left and right reticles are horizontally aligned.
9. Turn off the light sources for the sighting mechanisms. Once the initial adjustments are made, the user may remove his or her personalized module and a second user will follow the above steps.

The following acts illustrate actions taken when the EMD is to be exchanged from the first user to the second user during operation:
1. First user doffs the EMD and removes his or her personalized module.
2. Second user inserts his or her personalized module and dons the EMD. The second user's personalized fittings for nose and ears, and corrective eyeglass lenses if required, are contained in the second personalized module.
3. Second user turns on the light sources for the sighting mechanisms and turns knob 1734 to adjust for his or her IPD.
4. Second user turns of the light sources.

The interconnection of carriage 1722 and lenses 1718 and 1720 eliminates the need for the second user to refocus the image in display pod 100 when adjusting for his or her IPD. The internal sighting mechanisms guarantee that the user's line of sight will extend to the center of intermediate image planes 1710 and 1712, thereby maximizing the user's light box and reducing eye fatigue.

Some embodiments of the EMD may include additional features. The EMD may include a battery pack (not shown) to provide power to display pod 100. The battery pack may be mounted to the head strap (not shown) connecting the ear pieces so that the battery pack's weight counterbalances the weight of display pod 100. The EMD may also include a microphone attached, for example, to frame 10 or display pod 100. And FIG. 1 shows speaker 30 mounted on right ear piece 20, but a second speaker may be mounted on left ear piece 22 as well.

The present invention has been described with reference to specific embodiments. These embodiments are illustrative of the invention and are not to be construed as limiting the invention. Various modifications may occur to those skilled in the art without departing from the true spirit and scope of the invention as defined by the following claims.

We claim:

1. A display apparatus comprising:
    a frame, the frame including a cross-bracket, a left ear piece, and a right ear piece, wherein the left ear piece is coupled to an end of the cross-bracket and the right ear piece is coupled to another end of the cross-bracket;
    a display pod mounted to the cross-bracket, the display pod including an electronic video image generator and optics for creating a virtual image of an image generated by the electronic video image generator; and
    a personalized module rigidly and removably coupled to the cross-bracket, wherein the personalized module includes an adjustment mechanism; and
    wherein the adjustment mechanism allows a user, when wearing the apparatus, to adjust a position of the display pod with respect the eyes of the user, and wherein the adjustment mechanism includes a cam, the cam resting against a portion of the frame so as to adjust a position of either the left or the right ear piece with respect to the display pod, thereby adjusting a pitch and or a roll angle of the display pod with respect to the eyes of the user.

2. The device of claim 1 wherein the left and right ear pieces are pivotally coupled to the cross-bracket, and are spring-loaded inward against the head of the user.

3. The device of claim 1 wherein the adjustment mechanism includes an adjustable nose piece assembly configured to rest on the nose of the user, and the nose piece assembly includes detents to secure a horizontal and a vertical position of the display pod with respect to the eyes of the user.

4. The device of claim 1 wherein the adjustment mechanism includes an adjustable nose piece assembly configured to rest on the nose of the user, and the nose piece assembly includes detents to secure a looking angle of the user into the display pod.

5. The device of claim 1 wherein the personalized module includes at least one corrective ophthalmic lens.

6. The device of claim 5 wherein the ophthalmic lens provides substantially the same ophthalmic correction provided by spectacles prescribed for the user.

7. A display apparatus comprising:
    a frame, the frame including a cross-bracket, a left ear piece, and a right ear piece, wherein the left ear piece is coupled to an end of the cross-bracket and the right ear piece is coupled to another end of the cross-bracket, and wherein the left ear piece and the right ear piece are pivotally coupled to the cross-bracket;
    a display pod mounted to the cross-bracket, the display pod including an electronic video image generator and optics for creating a virtual image of an image generated by the electronic video image generator; and
    a personalized module rigidly and removably coupled to the cross-bracket, wherein the personalized module includes an adjustment mechanism;
    wherein the adjustment mechanism allows a user, when wearing the apparatus, to adjust a position of the display pod with respect the eyes of the user, and wherein the adjustment mechanism includes a first cam resting against a portion of the left ear piece such that the first cam when turned adjusts a position of the left ear piece, and a second cam resting against a portion of the right ear piece such that the second cam when turned adjusts a position of the right ear piece.

8. A method of displaying an electrically generated image to a user, the method comprising the acts of:
    providing a display apparatus, the display apparatus including a frame and a display pod attached to the frame, the frame including a cross-bracket and two ear pieces each coupled to the cross-bracket, the display pod including an image generator for generating the electrically generated image and display optics for creating a virtual image of the electrically generated image;
    removably coupling a first personalized module to the frame, the first personalized module including a first adjustment mechanism for fitting the apparatus to a first user's head;
    placing the apparatus on the first user's head so as to rest on the first user's nose and ears; and
    adjusting the first adjustment mechanism so as to allow the first user to see the electrically generated image; wherein adjusting the first adjustment mechanism comprises turning a cam to adjust a roll angle of the display pod with respect to the first user's eyes.

9. The method of claim 8 further comprising the acts of:
    removing the first personalized module from the frame;
    removably coupling a second personalized module to the frame, the second personalized module including a second adjustment mechanism for fitting the apparatus to a second user's head;

placing on the second user's head the display apparatus with the second personalized module attached so as to rest on the second user's nose and ears; and adjusting the second adjustment mechanism so as to allow the second user to see the electrically generated image.

10. The method of claims 9 further comprising the acts of:

removing the second personalized module from the display apparatus;

removably recoupling the first personalized module to the display apparatus; and replacing on the first user's head the display apparatus having the first personalized module attached, so as to allow the first user to see the electrically generated image without significantly adjusting the first adjustment mechanism.

11. The method of claim 8 wherein adjusting the first adjustment mechanism comprises positioning a nose piece assembly resting on the first user's nose.

12. A method of displaying an electrically generated image to a user, the method comprising the acts of:

providing a display apparatus, the display apparatus including a frame and a display pod attached to the frame, the frame including a cross-bracket and two ear pieces each coupled to the cross-bracket, the display pod including an image generator for generating the electrically generated image and display optics for creating a virtual image of the electrically generated image;

removably coupling a first personalized module to the frame, the first personalized module including a first adjustment mechanism for fitting the apparatus to a first placing the apparatus on the first user's head so as to rest on the first user's nose and ears; and adjusting the first adjustment mechanism so as to allow the first user to see the electrically generated image; wherein adjusting the first adjustment mechanism comprises turning a cam to adjust the pitch angle of the display pod with respect to the first user's eyes.

* * * * *